US010114076B2

(12) United States Patent
Guo et al.

(10) Patent No.: US 10,114,076 B2
(45) Date of Patent: Oct. 30, 2018

(54) SEMICONDUCTOR DEVICE FOR HYBRID ENERGY STORAGE SYSTEMS

(71) Applicant: NEC Laboratories America, Inc., Princeton, NJ (US)

(72) Inventors: Feng Guo, Sunnyvale, CA (US); Ratnesh Sharma, Fremont, CA (US)

(73) Assignee: NEC Corporation (JP)

( * ) Notice: Subject to any disclaimer, the term of this patent is extended or adjusted under 35 U.S.C. 154(b) by 288 days.

(21) Appl. No.: 15/093,263

(22) Filed: Apr. 7, 2016

(65) Prior Publication Data

US 2016/0299195 A1    Oct. 13, 2016

Related U.S. Application Data

(60) Provisional application No. 62/144,632, filed on Apr. 8, 2015.

(51) Int. Cl.
| | |
|---|---|
| *G01R 31/26* | (2014.01) |
| *G01R 31/36* | (2006.01) |
| *H02J 1/00* | (2006.01) |
| *H02M 7/537* | (2006.01) |
| *H02M 1/08* | (2006.01) |
| *G06F 17/50* | (2006.01) |
| *G06N 7/02* | (2006.01) |

(Continued)

(52) U.S. Cl.
CPC ..... *G01R 31/3648* (2013.01); *G01R 31/2601* (2013.01); *G06F 17/5068* (2013.01); *G06N 7/02* (2013.01); *H02J 1/00* (2013.01); *H02M 1/08* (2013.01); *H02M 7/483* (2013.01); *H02M 7/537* (2013.01); *H02M 2001/0054* (2013.01); *H02M 2007/4835* (2013.01); *Y02B 70/1491* (2013.01)

(58) Field of Classification Search
CPC .................................................. G01R 31/3644
See application file for complete search history.

(56) References Cited

U.S. PATENT DOCUMENTS 6,048,746 A * 4/2000 Burr ..................... G01R 31/275
438/14

OTHER PUBLICATIONS

Rohner, et al., "Modulation, Losses, and Semiconductor Requirements of Modular Multilevel Converters", IEEE Transactions on Industrial Electronics, Aug. 2010, pp. 2366-2642, vol. 57, No. 8.

(Continued)

*Primary Examiner* — Cheung Lee
(74) *Attorney, Agent, or Firm* — Joseph Kolodka

(57) ABSTRACT

Systems and methods for semiconductor device selection, including identifying a worst operation condition for a plurality of semiconductor devices in a Modular Multilevel Converter (MMC). The identifying includes determining power losses for each of the semiconductor devices under a plurality of operation conditions, and calculating a maximum junction temperature for each of the plurality of semiconductor devices at each of the plurality of operation conditions. A maximum junction temperature under the identified worst operation condition is determined for each of a plurality of commercially available semiconductor devices which satisfy a threshold voltage rating, and all semiconductor devices which satisfy the threshold voltage rating and a maximum junction temperature threshold condition are compared to identify a semiconductor device with a lowest system cost.

20 Claims, 10 Drawing Sheets

(51) Int. Cl.
*H02M 7/483* (2007.01)
*H02M 1/00* (2006.01)

(56) References Cited

OTHER PUBLICATIONS

Tu, et al., "Power Losses Evaluation for Modular Multilevel Converter with Junction Temperature Feedback", IEEE, Jul. 2011, pp. 1-7.

* cited by examiner

SEMICONDUCTOR DEVICE FOR HYBRID ENERGY STORAGE SYSTEMS

RELATED APPLICATION INFORMATION

This application claims priority to provisional application Ser. No. 62/144,632 filed on Apr. 8, 2015, incorporated herein by reference.

BACKGROUND

Technical Field

The present invention relates to semiconductor device selection, and, more particularly, to semiconductor device selection for modular multilevel converters in energy storage systems.

Description of the Related Art

To support the penetration of renewable energy generation in the power grid and to provide ancillary functions for system operation (e.g., compensate for the fluctuation), the demand for energy storage systems (ESSs), which may store a large amount of energy and provide high charging/discharging power as needed, has increased. However, single type energy storage elements cannot store a large amount of energy and provide high charging/discharging power, and as such, hybrid ESSs (HESSs) have been employed to utilize the advantages of different energy storage elements to provide a solution for this issue.

Batteries have a relatively large energy density and UltraCapacitors (UCs) have a large power density. By combining them together, the HESS can satisfy all the power requirements to smooth the PV output power. Furthermore, the UC can alleviate the high power burden on the battery, extend the battery lifetime, and reduce the size and power loss of the battery.

Conventional HESSs with a battery and a UC generally employ a two-stage configuration, which includes a dc/dc converter and a dc/ac inverter, and may further include a boost converter and/or a voltage source inverter (VSI). The addition of a dc/dc converter increases the system cost, and also introduces extra power loss. Furthermore, with the increased power and energy ratings of the HESS for utility-level applications, the power semiconductor devices and passive components in these topologies may become unsuitable to handle the high voltage and current presented in the system.

SUMMARY

A method for semiconductor device selection, including identifying a worst operation condition for a plurality of semiconductor devices in a Modular Multilevel Converter (MMC). The identifying includes determining power losses for each of the semiconductor devices under a plurality of operation conditions, and calculating a maximum junction temperature for each of the plurality of semiconductor devices at each of the plurality of operation conditions. A maximum junction temperature under the identified worst operation condition is determined for each of a plurality of commercially available semiconductor devices which satisfy a threshold voltage rating, and all semiconductor devices which satisfy the threshold voltage rating and a maximum junction temperature threshold condition are compared to identify a semiconductor device with a lowest system cost.

A system for semiconductor device selection, including an operation condition determiner for identifying a worst operation condition for a plurality of semiconductor devices in a Modular Multilevel Converter (MMC). The operation condition determiner is further configured to determine power losses for each of the semiconductor devices under a plurality of operation conditions, and to calculate a maximum junction temperature for each of the plurality of semiconductor devices at each of the plurality of operation conditions. A junction temperature determiner calculates a maximum junction temperature under the identified worst operation condition for each of a plurality of commercially available semiconductor devices which satisfy a threshold voltage rating. A device selector compares all semiconductor devices which satisfy the threshold voltage rating and a maximum junction temperature threshold condition to identify a semiconductor device with a lowest system cost.

A computer-readable storage medium including a computer-readable program for semiconductor device selection, wherein the computer-readable program when executed on a computer causes the computer to identify a worst operation condition for a plurality of semiconductor devices in a Modular Multilevel Converter (MMC). The identifying includes determining power losses for each of the semiconductor devices under a plurality of operation conditions, and calculating a maximum junction temperature for each of the plurality of semiconductor devices at each of the plurality of operation conditions. A maximum junction temperature under the identified worst operation condition is determined for each of a plurality of commercially available semiconductor devices which satisfy a threshold voltage rating, and all semiconductor devices which satisfy the threshold voltage rating and a maximum junction temperature threshold condition are compared to identify a semiconductor device with a lowest system cost.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles provide a system and method for semiconductor device selection for Modular Multilevel Converters (MMCs) and control frameworks for management of Energy Storage Systems (ESSs) (e.g., Hybrid ESSs (HESSs)), in accordance with various embodiments. In a particularly useful embodiment, semiconductor devices for MMCs in HESSs (which may combine a battery and an UltraCapacitor (UC)) may advantageously be selected based on ratings generated according to the present principles to maximize system efficiency and/or minimize system cost. In some embodiments, a two-layer control framework may be employed to control one or more HESSs according to the present principles.

As compared to conventional MMCs, embodiments of the present principles may have different principles of operation. Because of the integrated energy storage element, the average active power of each sub-module is not necessarily equal to zero and the power from the DC side is not necessarily equal to the alternating current (AC) side. Because the voltage of the UC changes with the state of charge (SoC), and because there is no DC/DC stage in each sub-module, the sum of UC voltages in one arm will not necessarily be equal to the battery voltage at a DC bus (as in conventional ESS topologies).

In one embodiment, the MMC according to the present principles may be employed for high power battery/UC HESSs. Half bridges integrated with low voltage UC modules may be utilized as a sub-module (SM) of a converter, and a high-voltage battery pack may be placed at a DC bus. Furthermore, as there may be two different power sources in an MMC using a HESS topology, operations are different from for example, MMCs in High Voltage Direct Current (HVDC) systems (e.g., with no large energy storage elements within SMs of the MMC, in which power from the dc side may always be equal to power from the ac side), and as such, selection guidelines for such ESS systems cannot be employed for semiconductor device selection in HESS systems.

Moreover, as compared to conventional HESS topologies, the MMC according to the present principles may include the following features: (1) a direct dc/ac conversion may be realized (e.g., increasing overall system efficiency); (2) eliminating the dc inductor and greatly reducing the size of the dc-link capacitor (e.g., reducing the cost of dc side passive components) by, for example, 50% or more; (3) the modular structure of the converter is advantageous for controlling grid energy storage systems with large voltage and power ratings; (4) eliminating the dc/dc stage in the SMs (e.g., greatly reducing the number of switches and passive components); and (5) reducing the voltage and current rating for a single device (e.g., enabling usage of low cost and high performance switching devices even if a total number of switches is increased) according to various embodiments.

Figure 1:
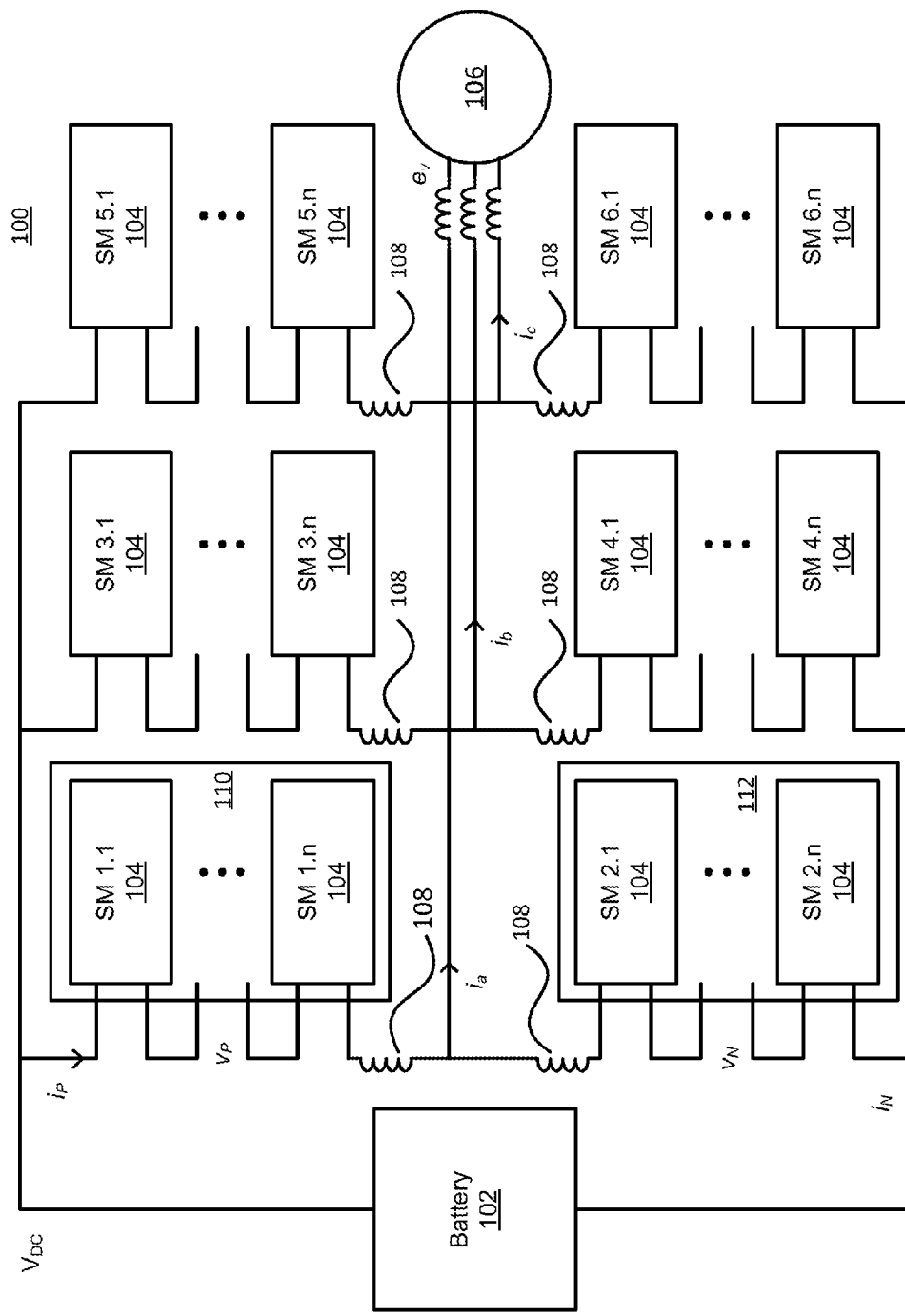
FIG. 1 shows an exemplary schematic of a modular multilevel converter (MMC) for Energy Storage Systems (ESSs), in accordance with one embodiment of the present principles.

Referring now to the drawings in which like numerals represent the same or similar elements and initially to FIG. 1, an exemplary schematic 100 of a modular multilevel converter for Energy Storage Systems (ESSs) is illustratively depicted in accordance with one embodiment of the present principles. In one embodiment, a battery 102 is connected in serial with groups of sub-modules 104. The battery 102 may be a high-voltage battery pack that may include multiple individual cells. Each group of sub-modules 104 may include n sub-modules; each arranged in serial and connected to a utility grid 106. Half of the sub-modules 104 (e.g., those shown as 2.x, 3.x, and 5.x) may be connected to the positive terminal of the battery 102, while the other half of the sub-modules 104 (e.g., those shown as 2.x, 4.x, and 6.x) may be connected to the negative terminal of the battery 102 according to the present principles. In one embodiment, an upper arm of sub-modules is represented in block 110 and a lower arm of sub-modules is represented in block 112.

In one embodiment, the MMC 100 may include three phases (e.g., sub-modules 1.x and 2.x, sub-modules 3.x and 4.x, and sub-modules 5.x and 6.x). In each phase, two identical strings of sub-modules 104 may be included with one buffer inductor 108. Each of the phases may produce one output that goes to the utility grid 106.

In one embodiment, the UC voltages for each SM may be equivalent, and thus, a total output voltage of all SMs 104 in each arm 110, 112 may be expressed as follows:

$$v_P = n_P v_{CP}, v_N = n_N v_{CN}, \tag{1}$$

where $n_P$ and $n_N$ are inserted numbers of SMs in the upper arm 110 and the lower arm 112, respectively, of one or more SMs. In addition, based on Kirchhoff's Voltage Law (KVL), $v_P$ and $v_N$ may be expressed as follows:

$$\begin{cases} v_P = \dfrac{V_{DC}}{2} - R_c i_P - L_c \dfrac{di_P}{dt} - v_{an} - v_{cm} \\ v_N = \dfrac{V_{DC}}{2} - R_c i_N - L_c \dfrac{di_N}{dt} - v_{an} - v_{cm} \end{cases}, \tag{2}$$

where $i_P$ and $i_N$ are the upper arm 110 and lower arm 112 current, respectively. $R_c$ and $L_c$ are the resistance and inductance of a buffer inductor, respectively. $v_{an}$ is the phase output voltage, and $v_{cm}$ is the common mode voltage. For simplicity of illustration, it is assumed that $v_{cm}=0$ in this embodiment. The circulating current $I_{circ}$ may be defined as follows:

$$i_{circ} = \dfrac{i_P + i_N}{2} = I_{circ} + \hat{i}_{circ}, \tag{3}$$

where $I_{circ}$ and $\hat{i}_{circ}$ are the dc and ac components of the circulating current, respectively.

In one embodiment, in the MMC 100, $I_{circ}$ may be directly related to the dc bus current, which may be the battery current in this example. $I_{circ}$ may be separated from the circulating current in some embodiments, and may be directly defined as $$\frac{I_{dc}}{3},$$

assuming for simplicity of illustration that the dc current is evenly distributed in the three phases. Further assuming that the output phase current is evenly distributed between the upper arm 110 and the lower arm 112, the arm currents may be expressed as follows:

$$i_P = \frac{i_a}{2} + i_{circ}, \quad (4)$$

$$i_N = -\frac{i_a}{2} + i_{circ},$$

where $i_a$ is the phase output current.

In some embodiments, a plurality of identical SMs 104 and one buffer inductor 108 may be included within each of a plurality of arms 110, 112 according to the present principles. In each SM 104, one low voltage UC, and two semiconductor devices may be included. The semiconductor devices in the SMs 104 may be, for example, an Insulated-Gate Bipolar Transistor (IGBT), Metal-Oxide-Semiconductor Field-Effect Transistor (MOFSET), etc. The present principles may be employed to properly select semiconductors in the SMs 104 within the MMC 100 to maximize system efficiency and minimize system cost according to various embodiments, which will be described in further detail herein after.

Figure 2:
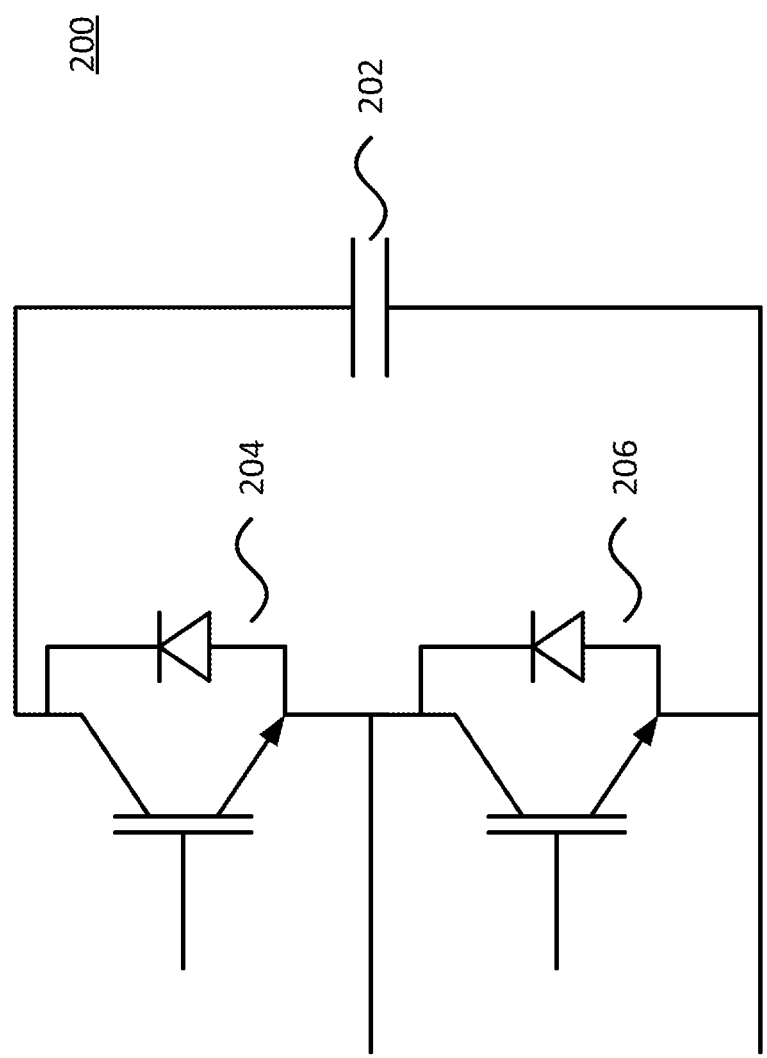
FIG. 2 shows an exemplary schematic of a sub-module (SM) of a modular multilevel converter (MMC) for Energy Storage Systems (ESSs), in accordance with one embodiment of the present principles.

Referring now to FIG. 2, with continued reference to FIG. 1, an exemplary schematic of an individual sub-module 200 of a modular multilevel converter is illustratively depicted in accordance with an embodiment of the present principles. In one embodiment, a low-voltage UC 202 may be employed with two semiconductor switches 204 and 206. The semiconductor switches 204 and 206 may be, for example, an IGBT or a MOSFET according to various embodiments.

In one embodiment, when the upper switch 204 is on, the sub-module 104 may be inserted into the circuit and the output voltage may be the UC 202 voltage. In one embodiment, when the lower switch 206 is on, the sub-module 104 may be bypassed from the circuit and the output voltage may be zero. The use of a half bridge in the sub-modules 104 may reduce the number of semiconductor switches and passive components in the MMC 100, and may increase the efficiency of the whole system according to various embodiments of the present principles. Although the above circuit topology is presented for illustrative purposes, it is noted that the present principles may be employed for any type of circuit according to various embodiments.

Figure 3:
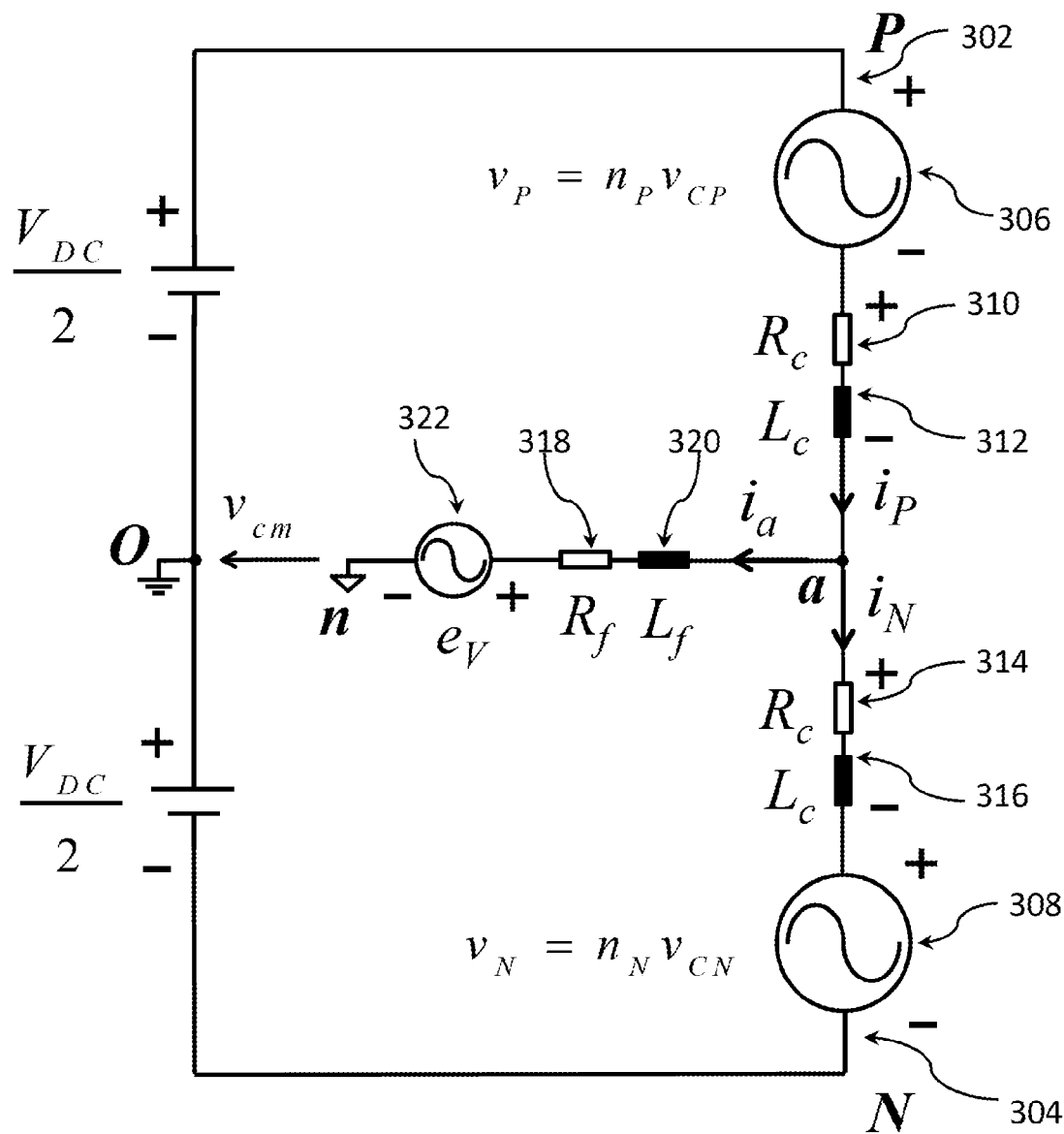
FIG. 3 shows an exemplary schematic of an equivalent circuit of a modular multilevel converter (MMC) for Energy Storage Systems (ESSs), in accordance with one embodiment of the present principles.

Referring now to FIG. 3, an exemplary schematic 300 of a single-phase equivalent circuit of a modular multilevel converter for Energy Storage Systems (ESSs) is illustratively depicted in accordance with one embodiment of the present principles. For simplicity of illustration, it may be assumed that the SM voltage balancing control is sufficient, so that the UC voltages are the same in each SM. Therefore, the total output voltage of all the SMs in each arm may be expressed as:

$$v_P = n_P v_{CP}, v_N = n_N v_{CN}, \quad (5)$$

where $n_P$ and $n_N$ are inserted numbers of SMs in the upper arm 302 and the lower arm 304, respectively, of one or more SMs.

In one embodiment, a controller (not shown) may be employed to regulate ESS (e.g., HESS) output power according to the present principles. The controller may be employed to generate a desired (e.g., predetermined threshold) number of inserted SMs (e.g., $n_P$ and $n_N$), which may be based on the desired HESS output power, battery reference power, and/or UC reference power according to various embodiments. It is noted that the HESS output power can be controlled by regulating the output current, and the battery power can be controlled by regulating the circulating current using a controller (not shown) according to the present principles. The UC power can be automatically regulated by the difference between the HESS output power and the battery power.

The differential equations to describe the output current and circulating current can be expressed as follows:

$$\begin{cases} \left(L_f + \frac{L_c}{2}\right)\frac{di_a}{dt} = -\left(R_f + \frac{R_c}{2}\right)i_a - \frac{v_P - v_N}{2} - e_v \\ L_c \frac{di_{circ}}{dt} = -R_c i_{circ} - \frac{v_P + v_N}{2} + \frac{V_{DC}}{2} \end{cases}, \quad (6)$$

where $R_c$ and $L_c$ are the resistance and inductance of the buffer inductor 310, 314, and 312, 316 respectively; $R_f$ and $L_f$ are the resistance and inductance of the filter inductor 318, 320, respectively; $i_a$ is the phase output current; and $e_v$ is the grid voltage 322 (or the back emf of the load). In some embodiments, $i_{circ}$ may represent the circulating current in each phase, and may be represented as follows:

$$i_{circ} = \frac{i_P + i_N}{2}. \quad (7)$$

Based on Equation 6, the present principles may be employed to regulate output current and circulating current independently from each other according to various embodiments.

For illustrative purposes, exemplary parameters of an MMC according to one embodiment of the present principles are shown in Table 1 (below). The MMC may be modeled in, for example, Matlab/Simulink with the parameters shown in Table 1, and at the AC side, the MMC may be connected to a utility grid using a line inductor.

TABLE 1

| Circuit Parameters for MMC | |
|---|---|
| Number of submodules per arm, N | 4 |
| Battery voltage, $V_{Batt}$ | 900~1200 V |
| UC voltage, $V_C$ | 225~350 V |
| Rated power, $P_{out}$ | 1 MW |
| Grid voltage, $V_{grid}$ | 480 Vrms |
| Fundamental frequency, f | 60 Hz |
| Switching frequency, $f_s$ | 1.25 kHz |
| Capacitance of the UC, C | 2.5 F |
| Resistance of the buffer inductor, $R_c$ | 2 mΩ |
| Inductance of the buffer inductor, $L_c$ | 500 uH |
| Line resistance, $R_{Line}$ | 1 mΩ |
| Line inductance, $L_{Line}$ | 120 uH |
| IGBT modules | Infineon FF600R07ME4_B11 |
| Number of modules per switch | 3 |
| Rated voltage | 600 V |
| Nominal current | 600 A |
| Total MVA ratings of all IGBT modules | 51.84 MVA |
| $R_{thJC\_T}$ | 0.083 K/W |

TABLE 1-continued

Circuit Parameters for MMC

| | |
|---|---|
| $R_{thCH\_T}$ | 0.04 K/W |
| $R_{thJC\_D}$ | 0.145 K/W |
| $R_{thCH\_D}$ | 0.042 K/W |

In this example, four SMs are implemented for each arm, and simulation results for both battery and UC outputting show that employment of MMCs according to the present principles provide increased average efficiency (e.g., >2%) as compared with conventional two-stage operation. Furthermore, with similar total semiconductor device ratings, the overall power handling capability of MMCs according to the present principles is significantly higher (e.g., 50%) than that of conventional two-stage operation.

Figure 4:
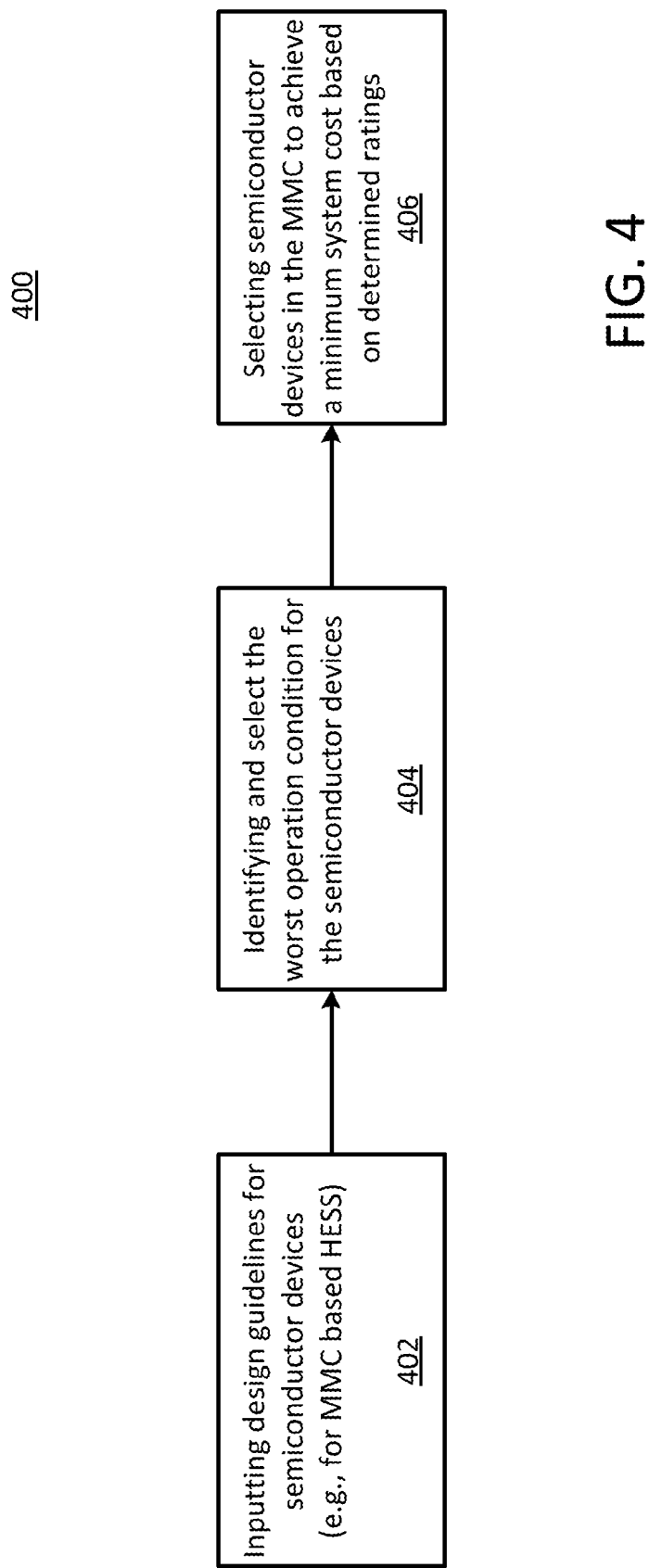
FIG. 4 shows an exemplary high level method for semiconductor device selection for modular multilevel converters (MMCs), in accordance with one embodiment of the present principles.

Referring now to FIG. 4, a block/flow diagram of an exemplary high level method 400 for semiconductor device selection for modular multilevel converters is illustratively depicted in accordance with one embodiment of the present principles.

In one embodiment, design guidelines for one or more semiconductor devices in one or more MMC based HESS s may be input in block 402. In block 404, a worst operating condition for one or more semiconductor devices in the one or more MMCs may be determined, and semiconductors may be selected accordingly, which will be described in further detail herein below. In block 406, proper ratings of one or more semiconductor devices may be determined and selected in the one or more MMCs to achieve a minimum system cost according to various embodiments of the present principles.

Figure 5:
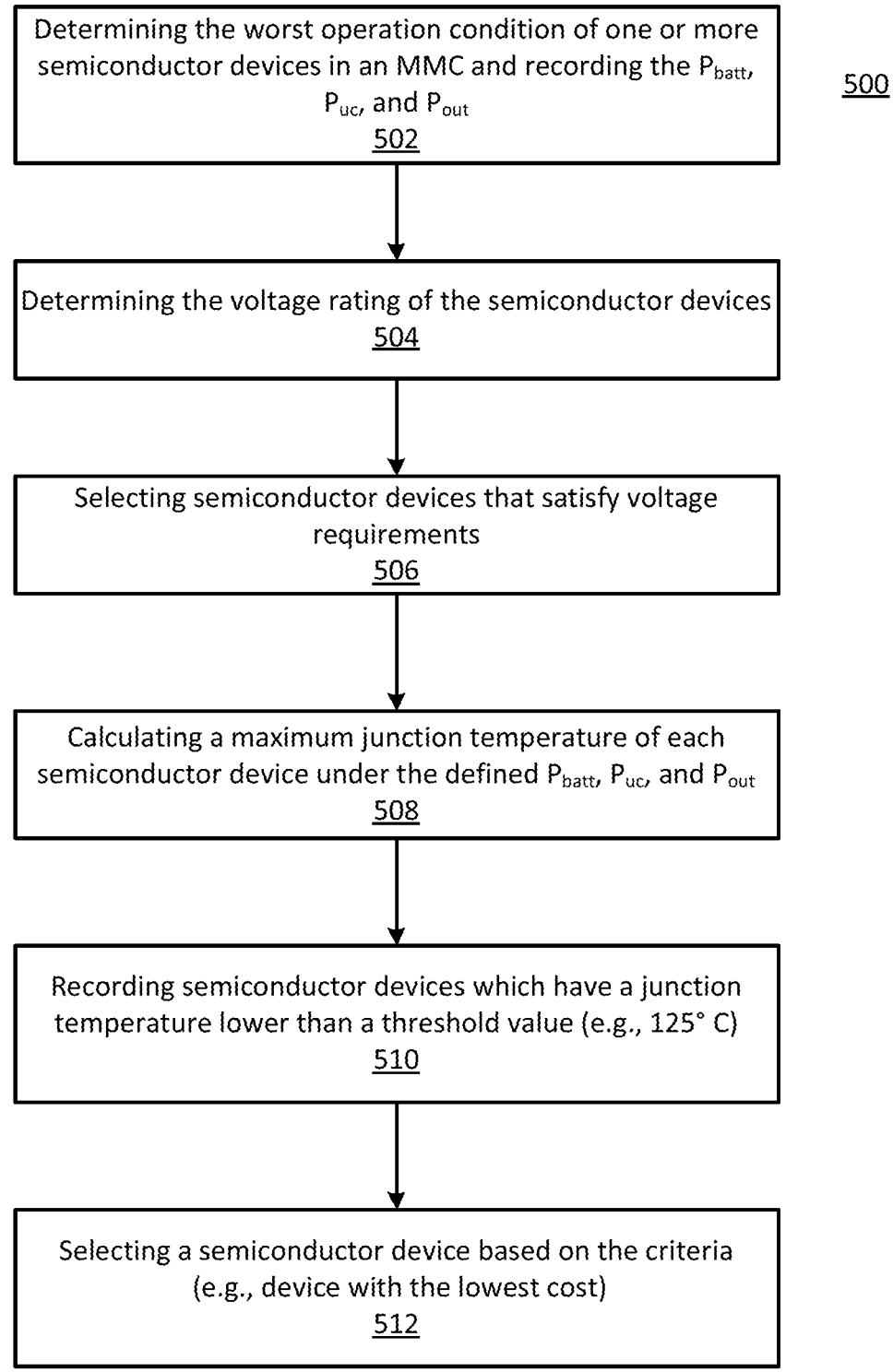
FIG. 5 shows an exemplary method for semiconductor device selection for modular multilevel converters (MMCs), in accordance with one embodiment of the present principles.

Referring now to FIG. 5, with continued reference to FIG. 4, an exemplary method 500, 404 for semiconductor device selection for modular multilevel converters is illustratively depicted in accordance with one embodiment of the present principles. In one embodiment, in block 502, a worst operation condition of one or more semiconductor devices in an MMC may be determined, and the $P_{batt}$, $P_{uc}$, and $P_{out}$ may be determined and stored in, for example, a non-transitory computer readable storage medium for later use according to the present principles.

In some embodiments, the system has bidirectional power flow capability. Under a specific output power, different power sharing between the battery and UC can be assigned. This makes the identification of worst operation condition in block 502 extremely complex, and this identification and selection of appropriate semiconductor devices will be described in further detail herein below. Once the worst operation condition is determined in block 502, the voltage rating of the semiconductor devices can be selected (e.g., referring to the maximum voltage stress of the devices) in block 504. In some embodiments, the voltage rating is selected higher than the maximum voltage stress so that a certain safety margin is left. In block 506, all possible semiconductor devices (e.g., currently available) that have the voltage rating obtained from block 504 may be selected and recorded as the candidates for the one or more MMCs.

In one embodiment, for each candidate, the maximum junction temperature under the defined worst operation condition may be calculated in block 508, which will be described in further detail herein below. In some embodiments, if the calculated maximum junction temperature exceeds a threshold temperature (e.g., >125° C.), this may indicate that the semiconductor device will be overstressed, and as such, does not satisfy system requirements. If the maximum junction temperature is below a threshold temperature (e.g., <125° C.), this may indicate that the semiconductor device is capable of handling the required power, and thus may be recorded for further comparison and analysis in block 510. All semiconductor devices that pass this criterion check in block 510 may be compared with each other, and a semiconductor device with a lowest determined cost may be selected for the one or more MMCs in block 512 according to the present principles.

Figure 6:
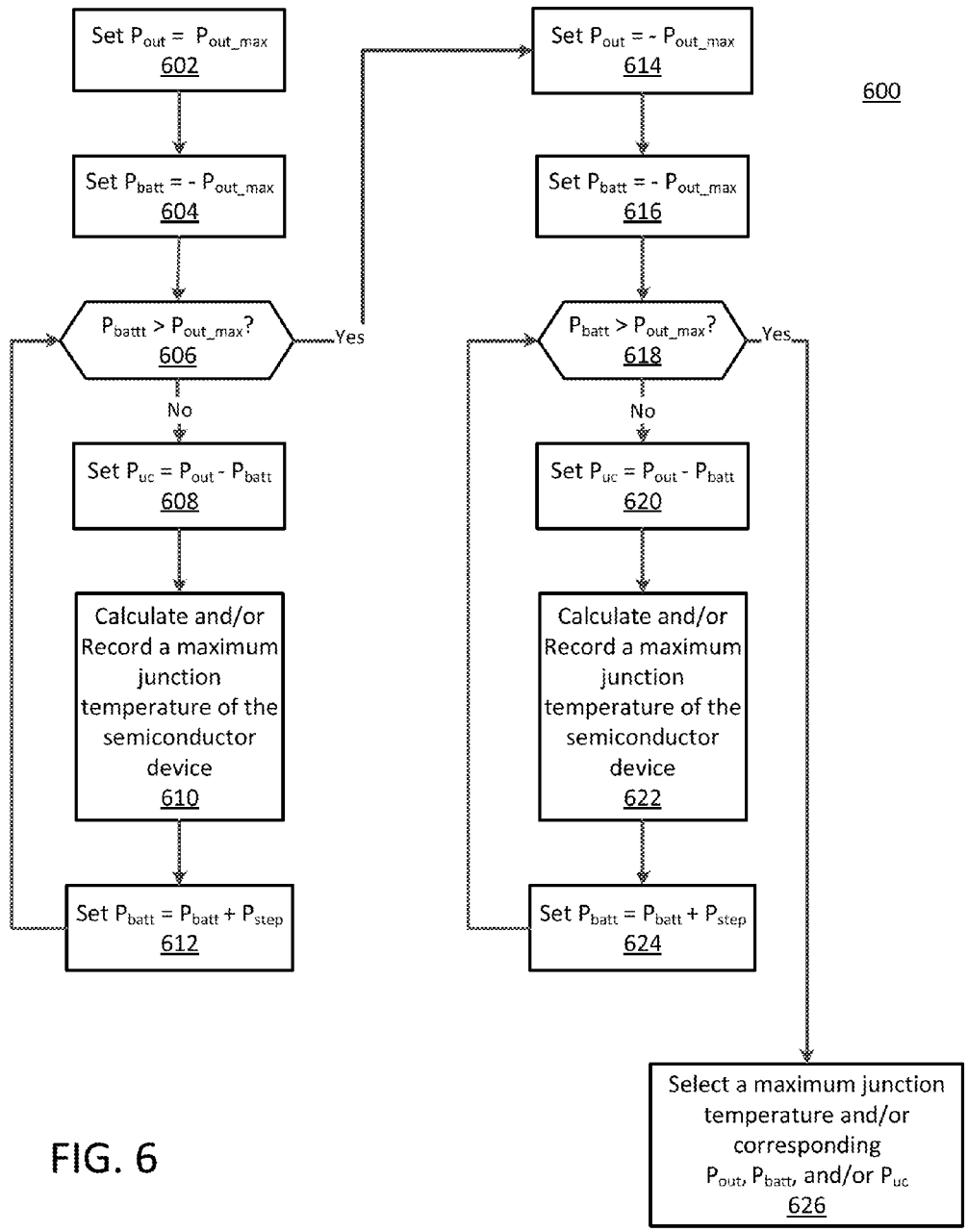
FIG. 6 shows an exemplary method for determining operating conditions of semiconductor devices in modular multilevel converters (MMCs), in accordance with one embodiment of the present principles.

Referring now to FIG. 6, an exemplary method 600 for determining operating conditions of semiconductor devices in modular multilevel converters is illustratively depicted in accordance with one embodiment of the present principles. In block 602, as the worst operation condition may always be happening when the output power is the positive maximum or negative maximum, the method 600 may begin by setting the output power ($P_{out}$) as positive maximum ($P_{out\_max}$) according to the present principles.

In some embodiments, there may be two energy sources in the MMC (e.g., the battery and the UC). At the same output power, there could be different combinations between the battery power ($P_{batt}$) and the UC power ($P_{uc}$). All these combinations may be considered to find the worst operation condition according to the present principles, and similarly to block 602, $P_{batt}$ may be set equal to the $-P_{out\_max}$ in block 604. In some embodiments, there may be a plurality of iterations of the next few steps. For example, at the beginning of each cycle, $P_{batt}$ may be compared with $P_{out\_max}$ in block 606. If $P_{batt}$ is larger than $P_{out\_max}$, the method proceeds to block 612. Otherwise, the method may proceed to block 608, and if $P_{batt}$ is smaller than $P_{out\_max}$, $P_{uc}$ may be set to be $P_{out}$ minus $P_{batt}$ in block 608 according to the present principles.

In one embodiment, after $P_{out}$, $P_{batt}$, and $P_{uc}$ are determined (e.g., fixed for one or more specific conditions), the maximum junction temperatures and/or power losses of the semiconductor device may be calculated in block 610 according to the present principles. The maximum junction temperature and the corresponding $P_{out}$, $P_{batt}$, and $P_{uc}$ may be recorded and stored (e.g., in a non-transitory computer readable storage medium) for further comparison. In some embodiments, after the maximum junction temperature of the semiconductor device is obtained for a particular operation condition in block 610, $P_{batt}$ may be increased by the amount of $P_{step}$ (e.g., 5% of $P_{out}$) in block 612. The updated $P_{batt}$ may be compared with $P_{out\_max}$ to determine whether the iteration should be continued or not.

In some embodiments, once $P_{batt}$ is larger than $P_{out\_max}$, all the operation conditions under $P_{out}=P_{out\_max}$ may be considered according to the present principles. Then, in block 614, $P_{out}$ may be set to be equal to $-P_{out\_max}$, and $P_{batt}$ may be set to be equal to $-P_{out\_max}$ in block 616. In some embodiments, there may be a plurality of iterations of the next few steps. For example, at the beginning of each cycle, $P_{batt}$ may be compared with $P_{out\_max}$. If $P_{batt}$ is determined to be larger than $P_{out\_max}$ in block 618, the method may proceed to block 626. Otherwise, the method may proceed to block 620, and if $P_{batt}$ is smaller than $P_{out\_max}$, $P_{uc}$ may be set to be $P_{out}$ minus $P_{batt}$ in block 620 according to the present principles.

In one embodiment, after $P_{out}$, $P_{batt}$, and $P_{uc}$ are fixed, the maximum junction temperatures and/or power losses of one or more semiconductor devices may be calculated in block 622 according to the present principles, and will be described in further detail herein below with reference to FIG. 7. The maximum junction temperature and the corresponding $P_{out}$, $P_{batt}$, and $P_{uc}$ may be recorded and stored (e.g., in a non-transitory computer readable storage medium) for further comparison. In some embodiments, after the maximum junction temperature of the semiconductor device is obtained in block 622, $P_{batt}$ may be increased by the amount of $P_{step}$ in block 624. The updated $P_{batt}$ may be compared with $P_{out\_max}$ to determine whether the iteration should be continued or not according to the present principles.

In some embodiments, once $P_{batt}$ is determined to be larger than $P_{out\_max}$, all the operation conditions under $P_{out}=-P_{out\_max}$ may be considered according to the present principles. These results may be combined with results obtained from operation conditions under $P_{out}=+P_{out\_max}$ to identify and/or select an operation condition when one or more semiconductor devices have a maximum junction temperature (e.g., a worst operation condition) in block 626 according to one embodiment of the present principles.

Figure 7:
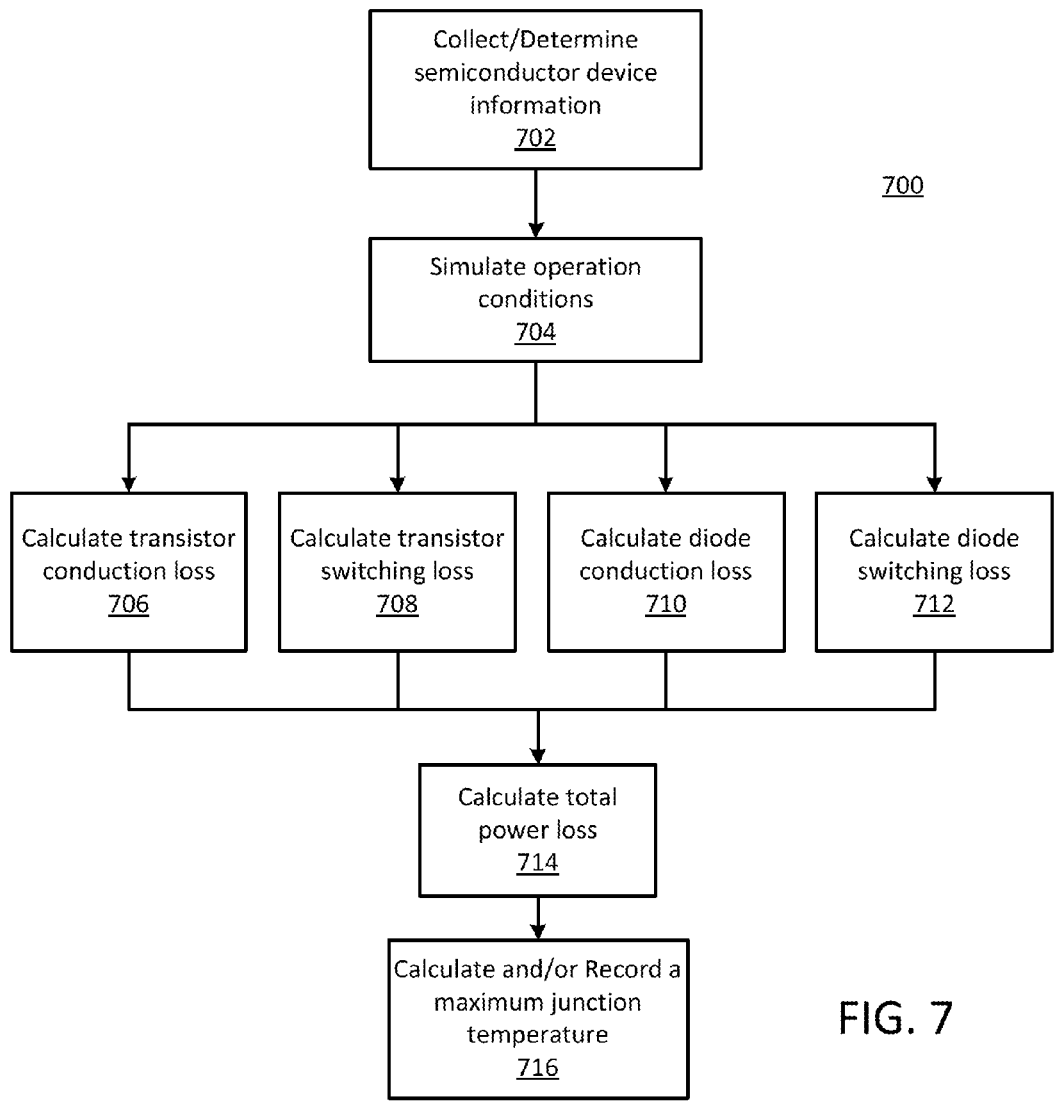
FIG. 7 shows an exemplary method for determining junction temperatures and power losses of semiconductor devices in modular multilevel converters (MMCs), in accordance with one embodiment of the present principles.

Referring now to FIG. 7, an exemplary method 700 for determining junction temperatures and power losses of semiconductor devices in modular multilevel converters is illustratively depicted in accordance with one embodiment of the present principles. The power loss of semiconductor devices in inverter systems generally includes conduction loss and switching loss. In some embodiments, by using, for example, datasheet specifications (e.g., from a manufacturer), and simulated voltage and current of one or more semiconductor devices, the power loss and thermal constraints may be determined according to the present principles.

In one embodiment, to calculate the junction temperature of a semiconductor device, the method 700 may include determining, and/or obtaining related parameters (e.g., forward voltage of the transistor and diode, the turn-on and turn-off energy loss of the transistor, etc.) from, for example, a datasheet provided by a manufacturer in block 702. In block 704, the operation of the MMC under specific $P_{out}$, $P_{batt}$, and $P_{uc}$ may be simulated, and the voltage and current waveforms of each semiconductor device may be recorded and stored (e.g., in a non-transitory computer readable storage medium) according to the present principles.

In some embodiments, the power loss of one or more semiconductor devices may be determined based on the parameters from the datasheet, and the voltage and current (e.g., voltage and current waveforms) of the semiconductor devices, and may include determining transistor conduction loss, transistor switching loss, diode conduction loss, and/or diode switching loss in blocks 706, 708, 710, and 712, respectively according to the present principles.

In some embodiments, characteristics of the transistor and the diode (e.g., anti-parallel diode) in an IGBT module may be quite different, and as such, the power losses of the two parts (e.g., transistors and diodes) may be calculated separately in blocks 706 and 710, respectively, according to the present principles. For illustrative purposes, it may be assumed that for each switch, the number of IGBT modules in parallel is $N_p$, and the current sharing between them is even. In steady state, the conduction loss of the transistor and diode in each IGBT module during a fundamental cycle can be determined according to the present principles as follows:

$$P_{con\_T} = \frac{\omega}{2\pi} \int_{t_s}^{t_s+\frac{2\pi}{\omega}} \left( \frac{i_C(\tau)}{N_p} * v_{CE}\left(\frac{i_C(\tau)}{N_p}\right) \right) d\tau \quad (8)$$

$$P_{con\_D} = \frac{\omega}{2\pi} \int_{t_s}^{t_s+\frac{2\pi}{\omega}} \left( \frac{i_F(\tau)}{N_p} * v_F\left(\frac{i_F(\tau)}{N_p}\right) \right) d\tau \quad (9)$$

where $\omega$ is the angular speed of the output current, $i_C(t)$ is the current flowing through all the paralleled transistors in the same switch, $i_F(t)$ is the current flowing through all the paralleled diodes, $v_{CE}(i_C(t))$ is the forward voltage of the transistor when the transistor is conducting a current of $i_C(t)$, and $v_F(i_F(t))$ is the forward voltage of the diode when the diode is conducting a current of $i_F(t)$.

In some embodiments, the relationships between $V_{CE}$ and $I_C$, and between $V_F$ and $I_F$ can be obtained from the device datasheet. At each time instant t, the transistor forward voltage $v_{CE}(t)$ or the diode forward voltage $v_F(t)$ can be determined by the simulated transistor current $i_C(t)$ or the diode current $i_F(t)$. The instantaneous power loss $p_{con}(t)$ can be calculated by multiplying $v_{CE}(t)$ with $i_C(t)$ or multiplying $v_F(t)$ with $i_F(t)$.

In some embodiments, in an IGBT module, transistors may generate loss during both turn-on and turn-off transitions, which may be related to the voltage and current stress of the device during the transition. For illustrative purposes, it may be assumed that for each switch, the number of IGBT modules in parallel is $N_p$, and the current sharing between them is even. In some embodiments, transistor switching loss may be determined in block 708 as follows:

$$P_{on\_T} = \frac{\omega}{2\pi} \sum_{\alpha=1}^{N_\alpha} \left( \frac{v_{CE\_off}(t_\alpha)}{v_{CE\_ref}} * E_{on}\left(\frac{i_C(t_\alpha)}{N_p}\right) \right) \quad (10)$$

$$P_{off\_T} = \frac{\omega}{2\pi} \sum_{\beta=1}^{N_\beta} \left( \frac{v_{CE\_off}(t_\beta)}{v_{CE\_ref}} * E_{off}\left(\frac{i_C(t_\beta)}{N_p}\right) \right), \quad (11)$$

where $N_\alpha$ and $N_\beta$ are the number of turn-on and turn-off transitions of the transistor in a fundamental cycle, respectively. $V_{CE\_off}(t)$ is the voltage stress of the transistor right before turn-on or right after turn-off, $i_C(t)$ is the current flowing through all the transistors in the same switch right after turn-on or right before turn-off, $E_{on}(i_C(t))$ is the turn-on energy loss of the transistor at the current of $i_C(t)$ and voltage of $V_{CE\_ref}$, and $E_{off}(i_C(t))$ is the turn-off energy loss of the transistor at the current of $i_C(t)$ and voltage of $V_{CE\_ref}$.

In some embodiments, one or more diodes may only generate a reverse recovery loss during turn-off transitions (and the turn-on loss may be negligible), and diode switching loss may be determined in block 712 according to the present principles as follows:

$$P_{rec\_D} = \frac{\omega}{2\pi} \sum_{\gamma=1}^{N_\gamma} \left( \frac{v_{F\_off}(t_\gamma)}{v_{F\_ref}} * E_{rec}\left(\frac{i_F(t_\gamma)}{N_p}\right) \right), \quad (12)$$

where $N_\gamma$ is the number of turn-off transition of the diode in a fundamental cycle, $V_{F\_off}(t)$ is the voltage stress of the diode right after turn-off, $i_F(t)$ is the current flowing through all the diodes in the same switch right before turn-off, and $E_{rec}(i_F(t))$ is the reverse recovery energy loss at the current of $i_F(t)$ and voltage of $V_{F\_ref}$.

The relationships between $E_{on}$ and $I_C$, between $E_{off}$ and $I_C$, and between $E_{rec}$ and $I_F$ can be obtained from the device datasheet. Based on the simulated current at the switching transition, the energy loss at reference voltage stress can be directly read from the datasheet. Then the energy loss may be scaled to the actual value by multiplying the ratio between the simulated voltage stress and the reference voltage stress of the device. The energy loss in each switching transition will be added up over a fundamental cycle, and divided by the time period of $2\pi/\omega$ to obtain the average switching power loss according to some embodiments of the present principles.

In some embodiments, after each part of the power losses is calculated in blocks 706, 708, 710, and 712, total power loss of a semiconductor device (e.g., total losses in the transistor and diode of the IGBT module) may be determined in block 714 as the sum of the switching losses determined in blocks 706, 708, 710, and 712:

$$P_{total\_T} = P_{con\_T} + P_{on\_T} + P_{off\_T} \quad (13)$$

$$P_{total\_D} = P_{con\_D} + P_{rec\_D}, \quad (14)$$

which may be represented as follows:

$$P_{Loss\_Total} = P_{con\_T} + P_{on\_T} + P_{off\_T} + P_{con\_D} + P_{rec\_D}. \quad (15)$$

In one embodiment, once the power loss in each semiconductor device is determined, a junction temperature of the semiconductor devices may be determined in block 716 using a thermal model according to the present principles. The junction temperatures of the transistor and the diode may be determined according to the present principles as follows:

$$T_{j\_T} = P_{total\_T}(R_{thJC\_T} + R_{thCH\_T}) + T_H \quad (16)$$

$$T_{j\_D} = P_{total\_D}(R_{thJC\_D} + R_{thCH\_D}) + T_H, \quad (17)$$

and a maximum junction temperature may be determined according to the present principles as follows:

$$T_{j\_max} = \max\{(P_{con\_T} + P_{on\_T} + P_{off\_T})(R_{thJC\_T} + R_{thCH\_T}) + T_H, (P_{con\_D} + P_{rec\_D})(R_{thJC\_D} + R_{thCH\_D}) + T_H\}, \quad (18)$$

where $R_{thJC\_T}$ and $R_{thCH\_T}$ are the junction-to-case and case-to-heatsink thermal resistance of the transistor, respectively. $R_{thJC\_D}$ and $R_{thCH\_D}$ are the junction-to-case and case-to-heatsink thermal resistance of the diode, respectively. $T_H$ is the heatsink temperature and for purposes of illustration may be assumed to be 80° C., and $T_a$ is the ambient temperature and for purposes of illustration may be assumed to be 25° C.

In some embodiments, a current rating of one or more semiconductor devices may be mainly determined by the junction temperature limitation at the worst case operating point according to the present principles. It is noted that for most Silicon-based devices, the maximum average junction temperature under any operation conditions is generally less than 125° C.

Based on the power loss and the thermal model, the maximum junction temperature of the semiconductor devices can be determined in block 716 according to the present principles. For the MMC according to the present principles, the maximum average junction temperature may be achieved when $P_{out} = P_{batt} = -1$ MW, and for conventional topologies, the maximum average junction temperature may be achieved when $P_{out} = P_{UC} = 1$ MW. Thus, at, for example, 1 MW power output, the conventional topology has reached the limitation of the junction temperature, but the MMC according to the present principles still has room left in terms of junction temperature. Therefore, it is apparent that the MMC according to the present principles can handle more power than the conventional topology even though their total device MVA ratings are similar according to various embodiments of the present principles.

Figure 8:
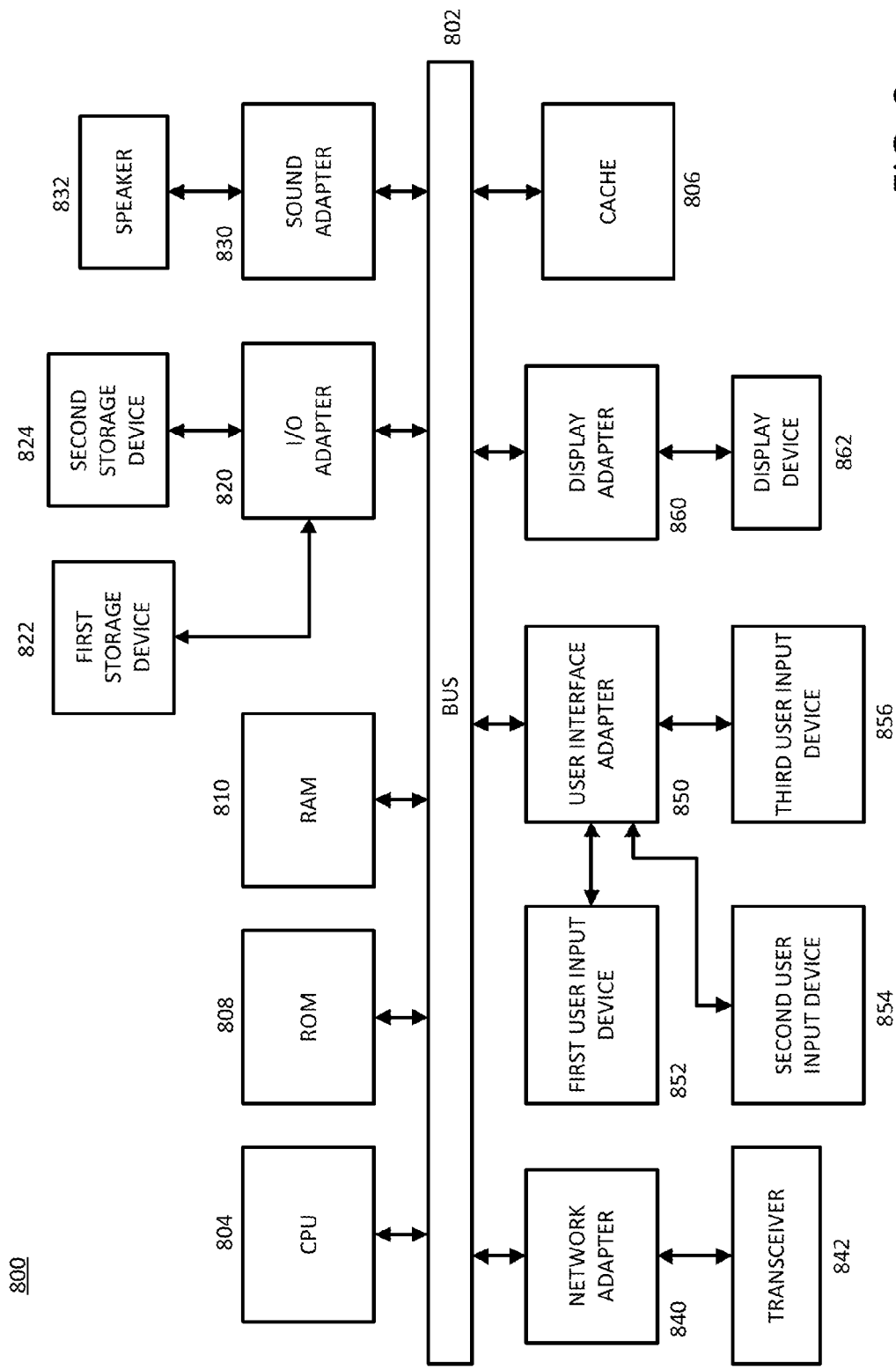
FIG. 8 shows an exemplary processing system to which the present principles may be applied, in accordance with an embodiment of the present principles.

Referring now to FIG. 8, an exemplary processing system 800, to which the present principles may be applied, is illustratively depicted in accordance with an embodiment of the present principles. The processing system 800 includes at least one processor (CPU) 804 operatively coupled to other components via a system bus 802. A cache 106, a Read Only Memory (ROM) 808, a Random Access Memory (RAM) 810, an input/output (I/O) adapter 820, a sound adapter 830, a network adapter 840, a user interface adapter 850, and a display adapter 860, are operatively coupled to the system bus 102.

A first storage device 822 and a second storage device 824 are operatively coupled to system bus 802 by the I/O adapter 120. The storage devices 822 and 824 can be any of a disk storage device (e.g., a magnetic or optical disk storage device), a solid state magnetic device, and so forth. The storage devices 822 and 824 can be the same type of storage device or different types of storage devices.

A speaker 832 is operatively coupled to system bus 802 by the sound adapter 830. A transceiver 842 is operatively coupled to system bus 802 by network adapter 840. A display device 862 is operatively coupled to system bus 802 by display adapter 860.

A first user input device 852, a second user input device 854, and a third user input device 856 are operatively coupled to system bus 802 by user interface adapter 850. The user input devices 852, 854, and 856 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 852, 854, and 856 can be the same type of user input device or different types of user input devices. The user input devices 852, 854, and 856 are used to input and output information to and from system 800.

Of course, the processing system 800 may also include other elements (not shown), as readily contemplated by one of skill in the art, as well as omit certain elements. For example, various other input devices and/or output devices can be included in processing system 800, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 800 are readily contemplated by one of ordinary skill in the art given the teachings of the present principles provided herein.

Moreover, it is to be appreciated that circuits/systems 100, 200, 300, 900, and 1000 described with respect to FIGS. 1, 2, 3, 9, and 10 are circuits/systems for implementing respective embodiments of the present principles. Part or all of processing system 800 may be implemented in one or more of the elements of systems 100, 200, 300, and 900, and 1000 of FIGS. 1, 2, 3, 9, and 10.

Further, it is to be appreciated that processing system 800 may perform at least part of the methods described herein including, for example, at least part of method 700 of FIG. 7. Similarly, part or all of circuits/systems 100, 200, 300, and

900, and 1000 of FIGS. 1, 2, 3, 9, and 10 may be used to perform at least part of the methods described herein including, for example, at least part of method 700 of FIG. 7.

Figure 9:
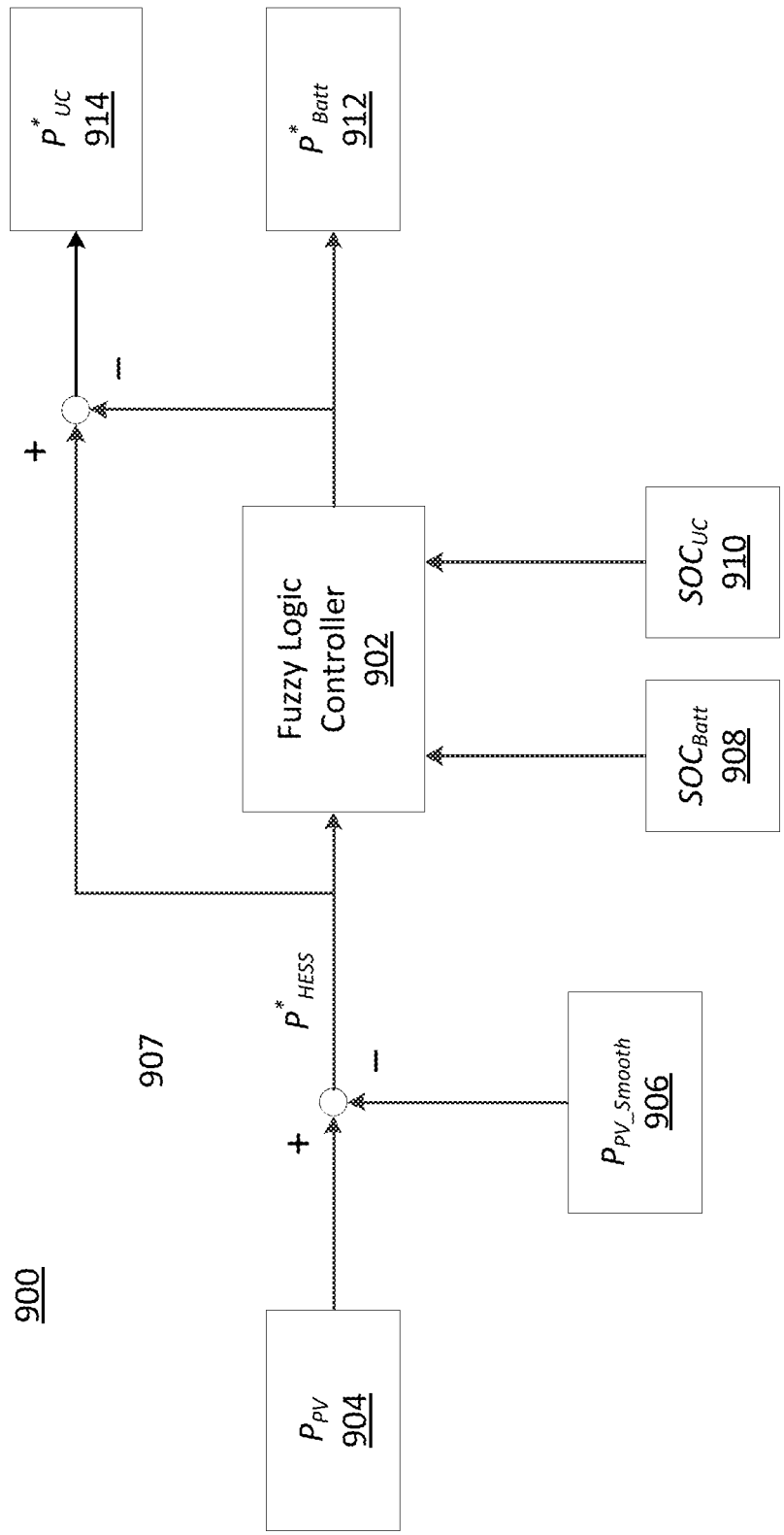
FIG. 9 shows an exemplary system/method for distribution of power using a fuzzy logic controller, in accordance with one embodiment of the present principles.

Referring now to FIG. 9, an exemplary system/method 900 for distribution of power using, for example, a fuzzy logic controller 902 is illustratively depicted in accordance with one embodiment of the present principles. In one embodiment, there may be two layers of control methods in the control framework of the controller. At the coordination layer, a fuzzy logic based method may be implemented using a fuzzy logic controller 902 to determine the power distribution between a battery and a UC in, for example, a HESS. In some embodiments, at the converter layer of the controller 902, the battery power and output power may be controlled independently, so the power from the battery and UC can be controlled separately, according to the present principles.

In one embodiment, the requested HESS output power 907 that may be received as input to the fuzzy logic controller 902 may be the difference between the actual power 904 and the smoothed power 906. To utilize the different characteristics of the battery and the UC, the fuzzy logic controller 902 may be implemented at the coordination layer and may be employed to distribute power between storage elements (e.g., battery and UC) according to the present principles.

In various embodiments, the smoothed power 906 may be obtained from different methods (e.g., a constant value, a low-pass filtered value of the actual power, etc.). The battery power 912 may be directly regulated by the fuzzy logic controller 902, since the battery charging and discharging power can greatly affect its life cycle and may be more constrained (e.g., as compared to the UC). The UC power 914 may then be determined by the subtraction of battery power 912 from the requested HESS output power 907. As such, the fuzzy logic controller 902 may control both battery and UC power of the HESS to ensure that both battery and UC operate in the safety region. Furthermore, the controller 902 can intelligently distribute the power between the battery and UC, such that the battery outputs baseline power with a pre-calculated/user-defined dynamic low peak value, and the ultracapacitor outputs fluctuating power with a pre-calculated/user-defined dynamic high peak value.

In one embodiment, the fuzzy logic controller 902 may take the State of Charge (SOC) of the battery 908, SOC of the UC 910, and/or the requested HESS output power 907 as input variables. The controller 902 may be designed based on, for example, the selection of fuzzy rules, as well as the number and shape of the membership functions of each fuzzy variable according to various embodiments of the present principles.

For example, in some embodiments, the fuzzy rules for the fuzzy controller 902 may be designed and/or enforced as follows: (1) the battery provides a low and smooth power supply; (2) the battery is acting as a complementary energy resource to help regulate the UC SOC when it is approaching the predefined boundary; and (3) the UC shares more power when its SOC located in normal region to relieve the battery from high power demands, which may be different on a case by case basis. The fuzzy logic controller 902 may be employed to intelligently distribute power between the battery and the UC, thereby enabling optimal battery operation conditions and extending battery life according to the present principles.

In some embodiments, the fuzzy logic controller 902 may be implemented in a two layer controller, including, for example, a coordination layer and a converter layer according to the present principles. It is to be appreciated that although a fuzzy logic controller has been discussed above, it is contemplated that a plurality of types of controllers may be employed according to various embodiments of the present principles.

Figure 10:
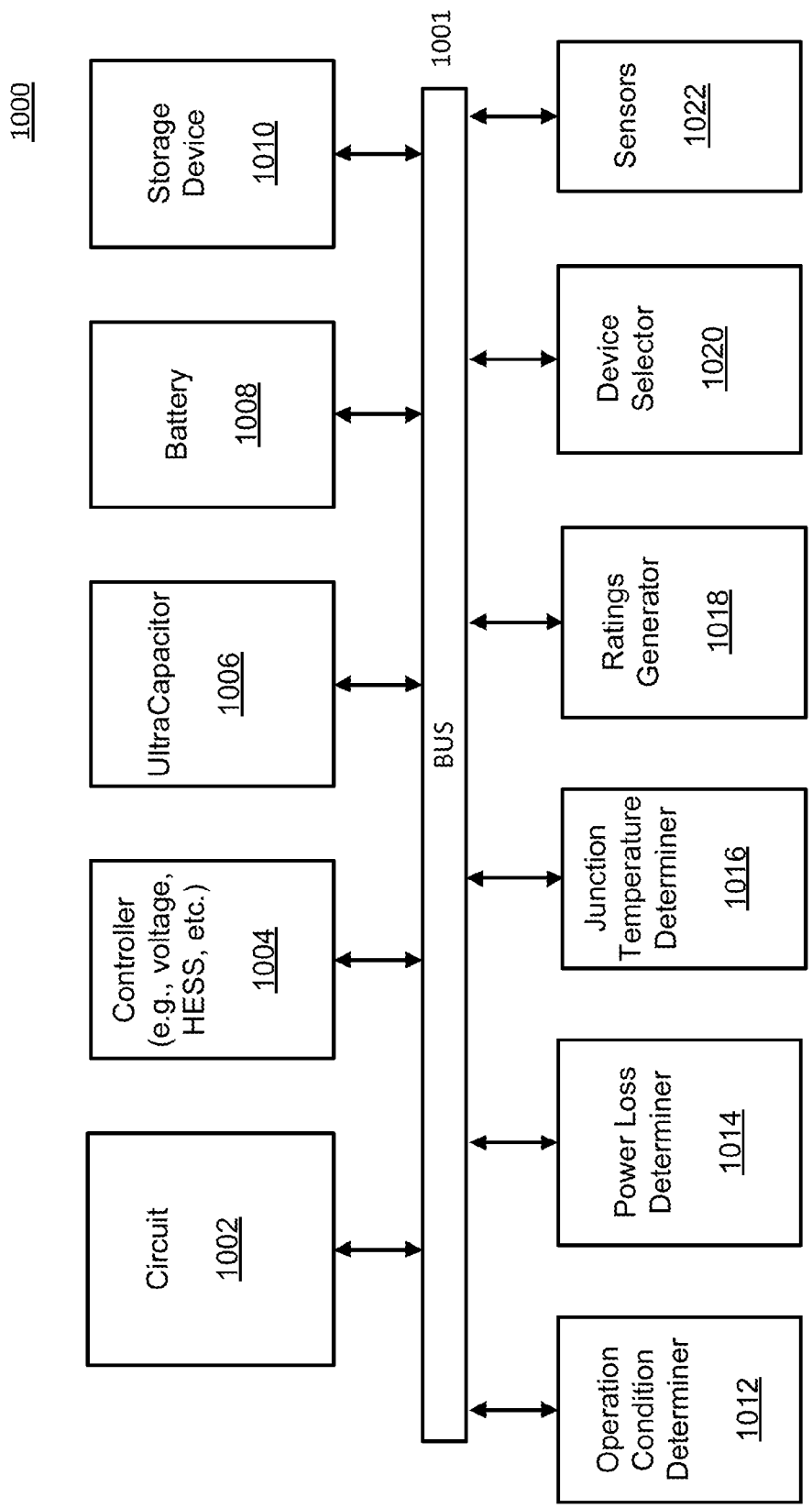
FIG. 10 shows an exemplary system for semiconductor device selection for modular multilevel converters (MMCs) and control frameworks for management of Energy Storage Systems (ESSs), in accordance with one embodiment of the present principles.

Referring now to FIG. 10, an exemplary system 1000 for managing hybrid energy storage systems (HESSs) using a modular multilevel converter and control framework is illustratively depicted in accordance with an embodiment of the present principles.

While many aspects of system 1000 are described in singular form for the sakes of illustration and clarity, the same can be applied to multiples ones of the items mentioned with respect to the description of system 1000. For example, while a single, battery 1020 may be mentioned with respect to a HESS, more than one battery 1020 can be used in accordance with the teachings of the present principles, while maintaining the spirit of the present principles. Moreover, it is appreciated that battery 1020 is but one aspect involved with system 1000 than can be extended to plural form while maintaining the spirit of the present principles.

In one embodiment, the system 1000 may include a plurality of components, which may include one or more circuits 1002, controllers 1004, UltraCapacitors 1006, batteries 1008, and/or storage devices 1010 (e.g., computer readable storage medium). In some embodiments, the system may further include one or more operation condition determiners 1012, power loss determiners 1014, junction temperature determiners 1016, ratings generators 1018, and/or device selectors 1020 (e.g., semiconductor device selectors). The above components may be connected by, for example, a bus 1001, and data (e.g., system condition data, temperature, voltage, etc.) may be collected using, for example, one or more sensors 1022 according to various embodiments of the present principles.

In one embodiment, an operation condition determiner 1012 may be employed to determine, for example, a worst operation condition of one or more semiconductor devices in an MMC, and may record results in a storage device 1010. A power loss determiner 1014 may be employed to determine power loss for a semiconductor device (e.g., transistor conduction/switching loss, diode conduction/switching loss, total power loss, etc.) according to various embodiments of the present principles.

A junction temperature determiner 1016 may be employed to calculate, for example, a maximum junction temperature, and in some embodiments, if the calculated maximum junction temperature exceeds a threshold temperature (e.g., >125° C.), this may indicate that the semiconductor device will be overstressed, and as such, does not satisfy system requirements. If the maximum junction temperature is below a threshold temperature (e.g., <125° C.), this may indicate that the semiconductor device is capable of handling the required power, and thus may be recorded for further comparison and analysis. All semiconductor devices that pass this criteria check (e.g., below junction threshold) may be compared with each other, and a ratings generator 1018 may generate ratings of components of the semiconductor device. In some embodiments, a semiconductor device with a lowest determined cost may be selected for the one or more MMCs using a device selector 1020, and employed, for example, in an MMC for a HESS according to the present principles.

It should be understood that embodiments described herein may be entirely hardware or may include both hardware and software elements, which includes but is not limited to firmware, resident software, microcode, etc. In a preferred embodiment, the present invention is implemented in hardware.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A method for semiconductor device selection, comprising:
    identifying a worst operation condition for a plurality of semiconductor devices in a Modular Multilevel Converter (MMC), the identifying comprising:
        determining power losses for each of the semiconductor devices under a plurality of operation conditions, and
        calculating a maximum junction temperature for each of the plurality of semiconductor devices at each of the plurality of operation conditions;
    determining a maximum junction temperature under the identified worst operation condition for each of a plurality of commercially available semiconductor devices which satisfy a threshold voltage rating;
    comparing all semiconductor devices which satisfy the threshold voltage rating and a maximum junction temperature threshold condition to identify a semiconductor device with a lowest system cost; and
    selecting and installing the semiconductor device with the lowest system cost in the MMC.

2. The method as recited in claim 1, wherein the determining power losses further comprises:
    separately determining transistor conduction, transistor switching, diode conduction, and diode switching losses; and
    combining the determined losses to identify total power losses of each of the semiconductor devices.

3. The method as recited in claim 1, wherein the identifying the worst operation condition further comprises:
    analyzing a plurality of combinations of battery power ($P_{batt}$) and UltraCapacitor power ($P_{uc}$) in the MMC, the analyzing comprising:
        setting output power ($P_{out}$) as a positive maximum ($P_{out\_max}$) and battery power equal to $-P_{out\_max}$;
        iteratively comparing $P_{batt}$ with $P_{out\_max}$;
        setting $P_{uc}$ equal to $P_{out}-P_{batt}$ if $P_{batt}$ is smaller than $P_{out\_max}$;
        adjusting $P_{batt}$ by a threshold step amount ($P_{step}$) until $P_{batt}$ is larger than $P_{out\_max}$ to generate a plurality of operation conditions for different combinations of $P_{out}$, $P_{batt}$, and $P_{uc}$;
        setting output power ($P_{out}$) as a negative maximum ($-P_{out\_max}$) and battery power equal to $-P_{out\_max}$;
        iteratively comparing $P_{batt}$ with $P_{out\_max}$;
        setting $P_{uc}$ equal to $P_{out}-P_{batt}$ if $P_{batt}$ is smaller than $P_{out\_max}$; and
        adjusting $P_{batt}$ by a threshold step amount ($P_{step}$) until $P_{batt}$ is larger than $P_{out\_max}$ to generate a plurality of operation conditions for different combinations of $P_{out}$, $P_{batt}$, and $P_{uc}$.

4. The method as recited in claim 3, wherein the maximum junction temperature for each of the plurality of semiconductors is iteratively calculated each time $P_{batt}$ is adjusted by $P_{step}$.

5. The method as recited in claim 1, wherein the identifying a worst operation condition further comprises determining power losses for each of a plurality of submodules (SMs) in the MMC.

6. The method as recited in claim 1, wherein the worst operating condition is present when output power ($P_{out}$) is a positive maximum or a negative maximum.

7. The method as recited in claim 1, wherein the plurality of commercially available semiconductor devices includes all commercially available semiconductor devices that satisfy the threshold voltage rating.

8. A system for semiconductor device selection, comprising:
    an operation condition determiner for identifying a worst operation condition for a plurality of semiconductor devices in a Modular Multilevel Converter (MMC), the operation condition determiner being further configured to:
        determine power losses for each of the semiconductor devices under a plurality of operation conditions, and
        calculate a maximum junction temperature for each of the plurality of semiconductor devices at each of the plurality of operation conditions;
    a junction temperature determiner for calculating a maximum junction temperature under the identified worst operation condition for each of a plurality of commercially available semiconductor devices which satisfy a threshold voltage rating; and a device selector for comparing all semiconductor devices which satisfy the threshold voltage rating and a maximum junction temperature threshold condition to identify a semiconductor device with a lowest system cost, the semiconductor device with the lowest system cost being selected and installed in the MMC.

9. The system as recited in claim 8, wherein the operation condition determiner is configured to calculate the power losses by separately determining transistor conduction, transistor switching, diode conduction, and diode switching losses, and combining the determined losses to identify total power losses of each of the semiconductor devices.

10. The system as recited in claim 8, wherein the identifying the worst operation condition using the operation condition determiner further comprises:

analyzing a plurality of combinations of battery power ($P_{batt}$) and UltraCapacitor power ($P_{uc}$) in the MMC, the analyzing comprising:
  setting output power ($P_{out}$) as a positive maximum ($P_{out\_max}$) and battery power equal to $-P_{out\_max}$;
  iteratively comparing $P_{batt}$ with $P_{out\_max}$;
  setting $P_{uc}$ equal to $P_{out}-P_{batt}$ if $P_{batt}$ is smaller than $P_{out\_max}$;
  adjusting $P_{batt}$ by a threshold step amount ($P_{step}$) until $P_{batt}$ is larger than $P_{out\_max}$ to generate a plurality of operation conditions for different combinations of $P_{out}$, $P_{batt}$, and $P_{uc}$;
  setting output power ($P_{out}$) as a negative maximum ($-P_{out\_max}$) and battery power equal to $-P_{out\_max}$;
  iteratively comparing $P_{batt}$ with $P_{out\_max}$;
  setting $P_{uc}$ equal to $P_{out}-P_{batt}$ if $P_{batt}$ is smaller than $P_{out\_max}$; and
  adjusting $P_{batt}$ by a threshold step amount ($P_{step}$) until $P_{batt}$ is larger than $P_{out\_max}$ to generate a plurality of operation conditions for different combinations of $P_{out}$, $P_{batt}$, and $P_{uc}$.

11. The system as recited in claim 10, wherein the maximum junction temperature for each of the plurality of semiconductors is iteratively calculated each time $P_{batt}$ is adjusted by $P_{step}$.

12. The system as recited in claim 8, wherein the operation condition determiner is further configured to determine power losses for each of a plurality of submodules (SMs) in the MMC.

13. The system as recited in claim 8, wherein the worst operating condition is present when output power ($P_{out}$) is a positive maximum or a negative maximum.

14. The system as recited in claim 8, wherein the plurality of commercially available semiconductor devices includes all commercially available semiconductor devices that satisfy the threshold voltage rating.

15. A non-transitory computer-readable storage medium including a computer-readable program for semiconductor device selection, wherein the computer-readable program when executed on a computer causes the computer to perform the steps of:

identifying a worst operation condition for a plurality of semiconductor devices in a Modular Multilevel Converter (MMC), the identifying comprising:
  determining power losses for each of the semiconductor devices under a plurality of operation conditions, and
  calculating a maximum junction temperature for each of the plurality of semiconductor devices at each of the plurality of operation conditions;
determining a maximum junction temperature under the identified worst operation condition for each of a plurality of commercially available semiconductor devices which satisfy a threshold voltage rating;
comparing all semiconductor devices which satisfy the threshold voltage rating and a maximum junction temperature threshold condition to identify a semiconductor device with a lowest system cost; and
selecting and installing the semiconductor device with the lowest system cost in the MMC.

16. The non-transitory computer-readable storage medium as recited in claim 15, wherein the determining power losses further comprises:
separately determining transistor conduction, transistor switching, diode conduction, and diode switching losses; and
combining the determined losses to identify total power losses of each of the semiconductor devices.

17. The non-transitory computer-readable storage medium as recited in claim 15, wherein the identifying the worst operation condition further comprises:

analyzing a plurality of combinations of battery power ($P_{batt}$) and UltraCapacitor power ($P_{uc}$) in the MMC, the analyzing comprising:
  setting output power ($P_{out}$) as a positive maximum ($P_{out\_max}$) and battery power equal to $-P_{out\_max}$;
  iteratively comparing $P_{batt}$ with $P_{out\_max}$;
  setting $P_{uc}$ equal to $P_{out}-P_{batt}$ if $P_{batt}$ is smaller than $P_{out\_max}$;
  adjusting $P_{batt}$ by a threshold step amount ($P_{step}$) until $P_{batt}$ is larger than $P_{out\_max}$ to generate a plurality of operation conditions for different combinations of $P_{out}$, $P_{batt}$, and $P_{uc}$;
  setting output power ($P_{out}$) as a negative maximum ($-P_{out\_max}$) and battery power equal to $-P_{out\_max}$;
  iteratively comparing $P_{batt}$ with $P_{out\_max}$;
  setting $P_{uc}$ equal to $P_{out}-P_{batt}$ if $P_{batt}$ is smaller than $P_{out\_max}$; and
  adjusting $P_{batt}$ by a threshold step amount ($P_{step}$) until $P_{batt}$ is larger than $P_{out\_max}$ to generate a plurality of operation conditions for different combinations of $P_{out}$, $P_{batt}$, and $P_{uc}$.

18. The computer-readable storage medium as recited in claim 17, wherein the maximum junction temperature for each of the plurality of semiconductors is iteratively calculated each time $P_{batt}$ is adjusted by $P_{step}$.

19. The non-transitory computer-readable storage medium as recited in claim 15, wherein the identifying a worst operation condition further comprises determining power losses for each of a plurality of submodules (SMs) in the MMC.

20. The non-transitory computer-readable storage medium as recited in claim 15, wherein the worst operating condition is present when output power ($P_{out}$) is a positive maximum or a negative maximum.

* * * * *